United States Patent
Xue

(10) Patent No.: US 8,305,676 B2
(45) Date of Patent: Nov. 6, 2012

(54) ELECTRO-OPTICAL DEFLECTION/MODULATION

(75) Inventor: Bin Xue, Mukilteo, WA (US)

(73) Assignee: Microvision, Inc., Redmond, WA (US)

( * ) Notice: Subject to any disclaimer, the term of this patent is extended or adjusted under 35 U.S.C. 154(b) by 399 days.

(21) Appl. No.: 12/642,119

(22) Filed: Dec. 18, 2009

(65) Prior Publication Data

US 2011/0149380 A1  Jun. 23, 2011

(51) Int. Cl.
*G02F 1/03* (2006.01)
*G02F 1/07* (2006.01)
*G02F 1/29* (2006.01)
*G02F 1/00* (2006.01)

(52) U.S. Cl. ........ 359/247; 359/250; 359/251; 359/252; 359/254; 359/255; 359/256; 359/259; 359/260; 359/261; 359/318; 359/323

(58) Field of Classification Search ............... 359/247, 359/250–252, 254–261, 263, 315–318, 323
See application file for complete search history.

(56) References Cited

U.S. PATENT DOCUMENTS

| 3,758,194 A | * | 9/1973 | Daval et al. ................ 359/260 |
| 4,281,904 A | * | 8/1981 | Sprague et al. ............. 359/263 |
| 2008/0297731 A1 | | 12/2008 | Powell et al. | |

OTHER PUBLICATIONS

Boyland, Alexander et al., "Electro-optically controlled beam switching via total internal reflection at a domain-engineered interface in LiNbO3", *Optics Communications*, 197 Sep. 15, 2001, 193-200.
Coppola, Giuseppe et al., "Visualization of optical deflection and switching operations by a domain-engineered-based LiNbO3 electro-optic device", *Optics Express*, vol. 11, No. 10, May 19, 2003, 1212-1222.
Eason, Robert et al., "Electro-optically controlled beam deflection for grazing incidence geometry on a domain-engineered interface in LiNbO3", *Optics Communications*, 197 Sep. 15, 2001, 201-207.
Iodice, Mario et al., "Electro-optically controlled switching and deflection in domain-engineered LiNbO3", *SPIE USE* 4944-31 Oct. 7, 2002, 1-8.

* cited by examiner

*Primary Examiner* — Evelyn A. Lester
(74) *Attorney, Agent, or Firm* — Kevin D. Wills

(57) ABSTRACT

An optical deflector includes multiple voltage-dependent refractive boundaries. Light passes through the refractive boundaries and accumulates a deflection angle. An electrode placed to apply a voltage to the boundaries may be non-uniform to modulate a wavefront as it passes. A scanning laser projector includes the optical deflector to modulate laser light.

8 Claims, 9 Drawing Sheets

ELECTRO-OPTICAL DEFLECTION/MODULATION

FIELD

The present invention relates generally to laser light systems, and more specifically to deflection and/or modulation of light.

BACKGROUND

Laser light modulation has many uses. One such use is scanning laser projectors. In a scanning laser projector, laser light is modulated at the pixel rate, which increases as the resolution of displays increases. Building laser light modulators that are fast enough is a challenge.

DESCRIPTION OF EMBODIMENTS

Figure 1A:
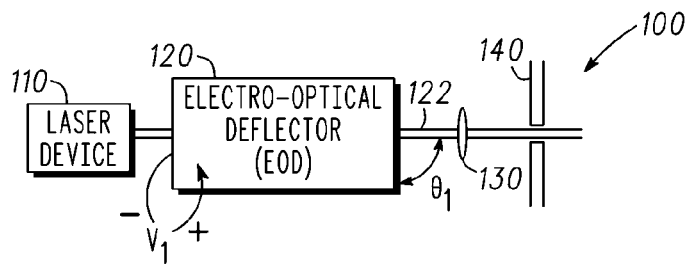
FIGS. 1A-C and 2A-C show electro-optical modulators in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIGS. 1A-C and 2A-C show electro-optical modulators in accordance with various embodiments of the present invention. Referring to FIG. 1A, electro-optical modulator (EOM) 100 includes laser device 110, electro-optical deflector (EOD) 120, lens 130, and coupling device 140. Laser device 110 may be any light source capable of producing coherent light. For example, laser device 110 may be a laser diode or any other type of laser producing device.

EOD 120 receives laser light from laser device 110 and produces an output beam at 122. The output beam is deflected by an angle $\theta$ that varies as an applied voltage V varies. The output beam 122 passes through lens 130 and is then coupled to coupling device 140.

Coupling device 140 is shown having an aperture through which the laser beam 122 passes. In some embodiments, the aperture is a hole, and in other embodiments, the aperture is a slit. The shape and/or size of the aperture in coupling device 140 is not a limitation of the present invention.

EOD 120 includes at least one material that has a voltage-dependent index of refraction. As a voltage is applied to EOD 120, the output beam angle $\theta$ varies as the index of refraction varies. In some embodiments, EOD 120 includes multiple different material regions that have different voltage-dependent refractive indices.

The laser beam traverses a light path within EOD 120 that crosses multiple boundaries between the different material regions, where each of the boundaries contributes a voltage-dependent deflection. The deflections from the multiple boundary crossings accumulate, resulting in the output beam deflection angle $\theta$.

The light path within EOD 120 is longer than any external dimension of EOD 120. As the light beam traverses the multiple boundaries within EOD 120, the light is reflected back and forth within the device. Some embodiments take advantage of total internal reflection (TIR), and other embodiments employ reflective surfaces where appropriate to redirect the light beam back through EOD 120. These and other embodiments are described in more detail with reference to later figures.

Figure 1B:
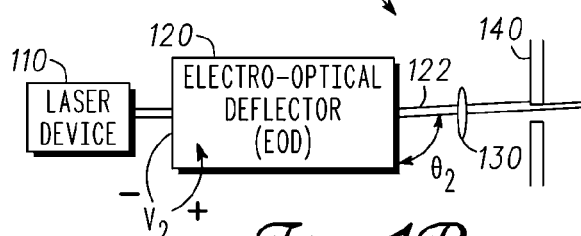
Figure 1C:
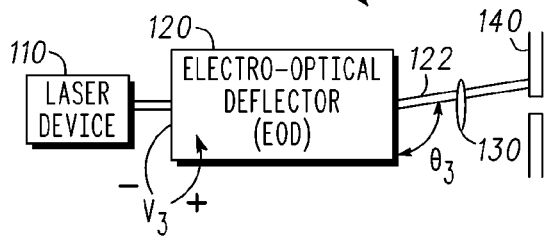

As shown in FIG. 1A, a voltage $V_1$ is applied to EOD 120, and an output beam deflection angle $\theta_1$ results. In this example, $\theta_1$ allows substantially all of output beam 122 to be coupled through coupling device 140. As shown in FIG. 1B, a voltage $V_2$ is applied to EOD 120, and an output beam deflection angle $\theta_2$ results. In this example, $\theta_2$ allows less than all of output beam 122 to be coupled through coupling device 140. And as shown at FIG. 1C, a voltage $V_3$ is applied to EOD 120, and an output beam deflection angle $\theta_3$ results. In this example, $\theta_3$ results in substantially zero coupling between output beam 122 and coupling device 140.

FIGS. 1A-1C demonstrate the operation of EOM 100 modulating laser light by the application of a voltage. The amount of light that emerges from coupling device 140 is a function of the voltage applied to EOD 120. The light may be modulated at extremely high speeds while employing a much slower light source. For example, laser device 110 may be a continuous wave laser device with relatively slow switching speeds, while EOM 100 produces modulated light at megahertz (MHz) or gigahertz (GHz) speeds.

Figure 2A:
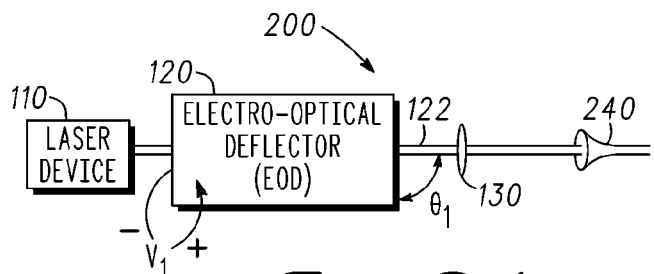

Referring now to FIG. 2A, EOM 200 includes laser device 110, EOD 120, lens 130, and coupling device 240. Laser device 110, EOD 120, and lens 130 are described above with reference to FIGS. 1A-1C. Coupling device 240 is shown as an optical fiber.

Figure 2B:
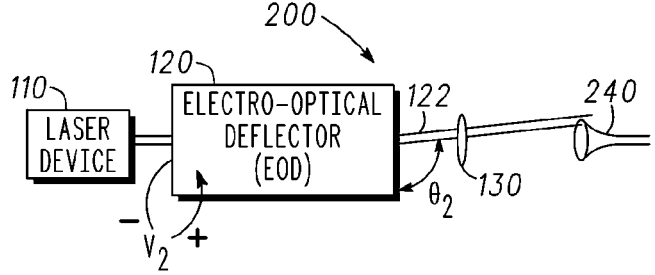
Figure 2C:
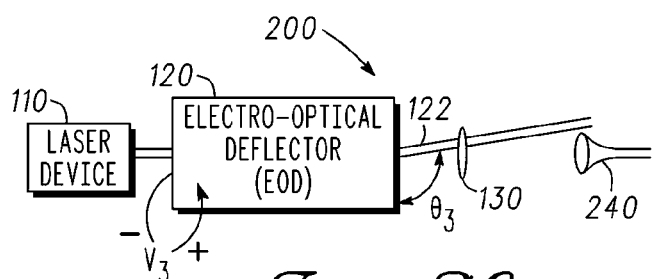

As shown in FIG. 2A, a voltage $V_1$ is applied to EOD 120, and an output beam deflection angle $\theta_1$ results. In this example, $\theta_1$ allows substantially all of output beam 122 to be coupled through coupling device 240. As shown in FIG. 2B, a voltage $V_2$ is applied to EOD 120, and an output beam deflection angle $\theta_2$ results. In this example, $\theta_2$ allows less than all of output beam 122 to be coupled through coupling device 240. And as shown at FIG. 2C, a voltage $V_3$ is applied to EOD 120, and an output beam deflection angle $\theta_3$ results. In this example, $\theta_3$ results in substantially zero coupling between output beam 122 and coupling device 240.

Optical fibers tend to be very small. For example, the core of single mode fiber is only 5 microns (um) for green wavelength light. A tapped intake, shown as a flared portion where beam 122 enters, the core of which is about 15 to 20 um, releases the alignment sensitivity and increase the system stability.

FIGS. 1A-1C and 2A-2C show EOMs that include apertures and fibers as coupling devices, although the present invention is not limited in this regard. For example, any type of coupling device may be employed in various embodiments of the invention.

Figure 3:
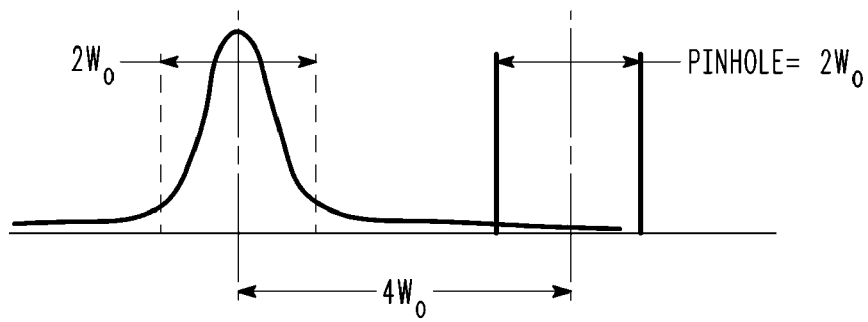
FIG. 3 shows coupling power as a function of deflection angle in accordance with various embodiments of the present invention.

FIG. 3 shows coupling power as a function of deflection angle in accordance with various embodiments of the present invention. Laser beams have what is referred to as a beam waist. The "beam waist" of a laser beam is the location along the propagation direction where the beam radius has a minimum. The "waist radius" is the beam radius at this location. As shown in FIG. 3, $W_0$ represents the waist radius at the coupling device (140, FIG. 1; 240, FIG. 2).

For a Gaussian beam, if the beam is offset >$4W_0$ from the center of the pinhole or fiber, the coupled power will drop to $\frac{1}{1000}$ of the full coupled power, or −30 db extinction ratio is achieved. This shows that with a sufficient deflection angle $\theta$, a very effective modulated laser light source can be achieved using deflection device 120.

Figure 4:
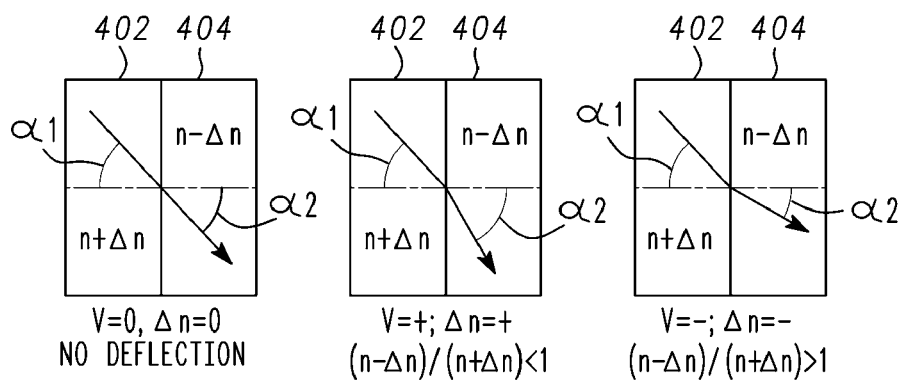
FIG. 4 shows light deflection across material boundaries when a voltage is applied in accordance with various embodiments of the present invention.

FIG. 4 shows light deflection across material boundaries when a voltage is applied in accordance with various embodiments of the present invention. As shown in FIG. 4, material regions 402 and 404 have different indices of refraction. The index of refraction of material region 402 is n+$\Delta$n, and the index of refraction of material region 404 is n−$\Delta$n where n is constant and $\Delta$n is voltage-dependent.

In some embodiments the materials used have ferroelectric properties, such as lithium niobate ($LiNbO_3$) or lithium tantalate ($LiTaO_3$). For example, in some embodiments, region 402 is $LiTaO_3$ and region 404 is "poled" $LiTaO_3$. The term "poled" refers to regions of domain inversion in the crystalline structure that result in an opposite polarity voltage-dependent change in index of refraction. Regions 402 and 404 are also referred to as "domains," and the boundary between regions 402 and 404 is also referred to as a "domain boundary." Permanent domain inversion can be obtained by the application of a high voltage. Domain inversion is generally known and is not further discussed herein.

FIG. 4 shows three different scenarios: no voltage applied so $\Delta$n is zero; a positive voltage is applied so $\Delta$n is positive; and a negative voltage is applied so $\Delta$n is negative. The angular deflection is shown greatly exaggerated so as to illustrate the direction of deflection based on voltage polarity.

For $LiTaO_3$ S-polarization, $\Delta$n is on the order of 1.57E-10* (V/d), where V is the applied voltage and d is the thickness of the wafer. For example, if V=100V and d=0.3 mm, then $\Delta$n=5.4E-5. The angles $\alpha_1$ and $\alpha_2$ are related by:

$$\sin(\alpha_2) = K\sin(\alpha 1)$$

where $$K = \frac{(n - \Delta n)}{(n + \Delta n)}$$

Because $\Delta$n is very small, a single pass through the material boundary does not provide much angular deflection of the beam unless a very large voltage is applied. Various embodiments of the present invention provide a light path that crosses multiple domain boundaries that accumulate an angular deflection. This allows lower voltages to be applied while still generating the desired angular deflection.

Figure 5:
FIG. 5 shows deflection sensitivity as a function of incident angle in accordance with various embodiments of the present invention.

FIG. 5 shows deflection sensitivity as a function of incident angle in accordance with various embodiments of the present invention. The sensitivity of $\alpha_2$ with respect to K is:

$$\frac{d(\alpha_2)}{dK} = \frac{\sin(\alpha_1)}{\sqrt{(1 - [K\sin\alpha_1]^2)}}$$

FIG. 5 plots this sensitivity as a function of the incident angle $\alpha_1$. It can be seen that the sensitivity is much higher as the incident angle approaches the point of total internal reflection (TIR), which in this example is between 89 and 90 degrees. Incident angles in this area of high sensitivity are said to be "grazing angles" in part because the light beam grazes along the domain boundary at a low angle. The sensitivity is much lower at non-grazing angles.

Various embodiments of the present invention provide a light path that crosses multiple domain boundaries at grazing angles where the deflection sensitivity is much higher. The deflection at each domain boundary crossing is summed to provide the output beam deflection angle shown in FIGS. 1A-1C and 2A-2C.

Figure 6:
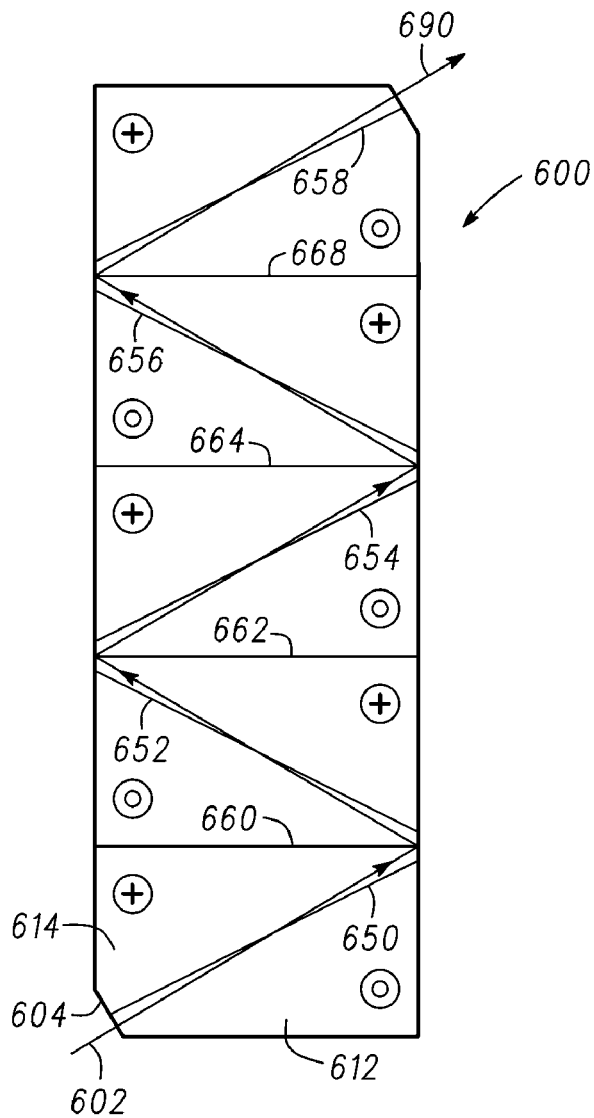
FIGS. 6-8 show electro-optical deflectors in accordance with various embodiments of the present invention.
Figure 7:
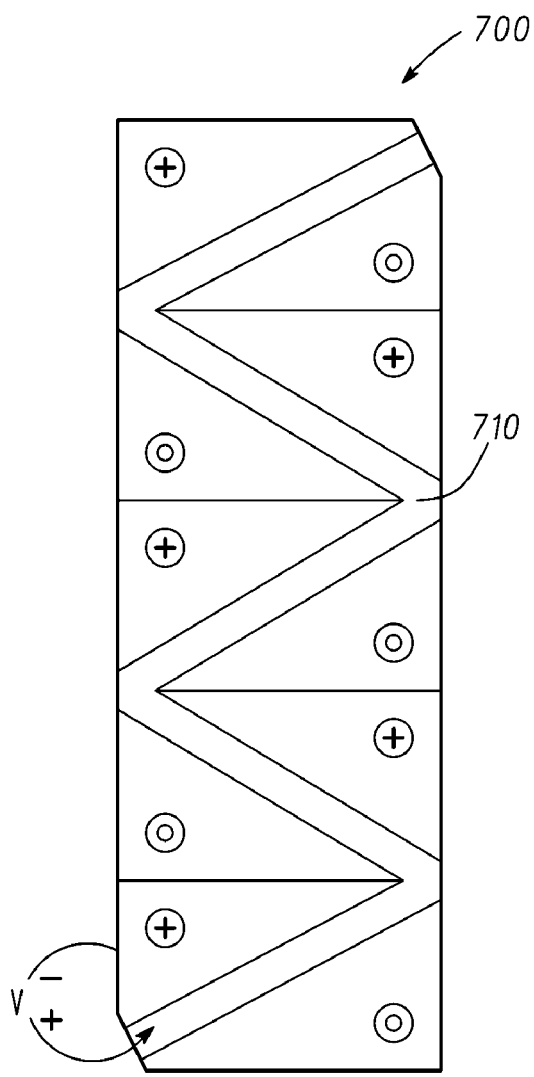
Figure 8:
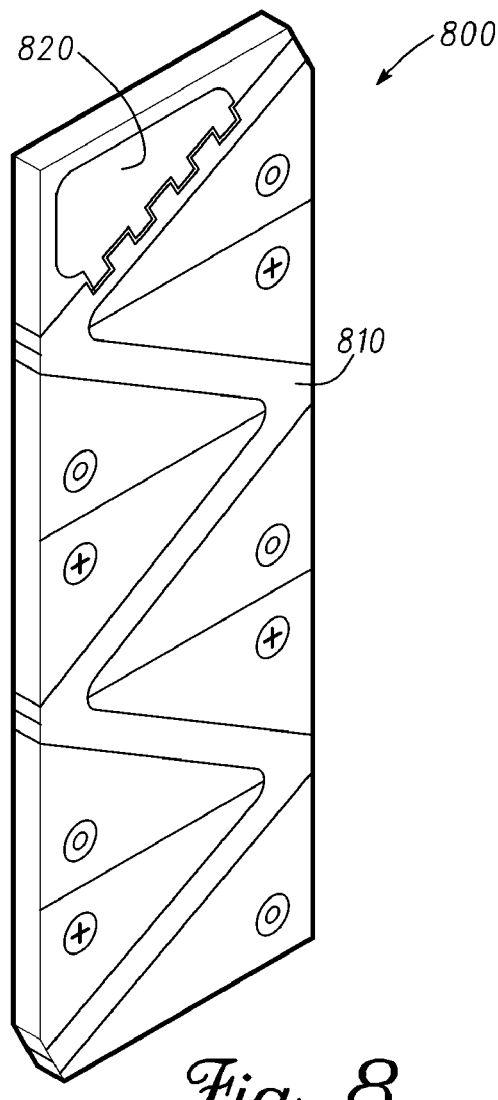

FIGS. 6-8 show electro-optical deflectors in accordance with various embodiments of the present invention. FIG. 6 shows inverted domains labeled with a circle and crosshairs, and shows non-inverted domains labeled with concentric circles. Laser beam 602 enters EOD 600 at face 604. Face 604 can be at any angle, although it is shown here at substantially 90 degrees to beam 602 to reduce the incident surface loss and to simplify the ray tracing in the diagram. Beam 602 enters EOD 600 at non-inverted domain region 612 and crosses boundary 650 into inverted domain region 614 at a small grazing angle. Beam 602 is shown as a ray in FIG. 6, but in practice, the beam has a finite diameter. Small grazing angles give higher voltage sensitivity but require a longer boundary line to cover the beam cross section. Accordingly, although beam 602 is shown crossing boundary 650 at a single point, in operation, the wavefront of the beam 602 crosses over a length of boundary 650.

Beam 602 reflects back and forth and repeatedly crosses like boundaries. For example, beam 602 crosses voltage-dependent refractive boundaries 650, 652, 654, 656, and 658, all of which are crossing from non-inverted domain regions to inverted domain regions at small grazing angles. These like boundaries are also referred to as boundaries of a first type. The deflection at each of these like boundaries sum to become part of the total deflection of the output beam 690.

Beam 602 also repeatedly crosses boundaries of a second type. For example, beam 602 crosses voltage-dependent refractive boundaries 660, 662, 664, and 668, all of which are crossing from inverted domain regions to non-inverted domain regions at larger angles. If a voltage is applied at the points where the second-type boundaries are crossed, the resulting deflections are in the opposite direction than those presented by the boundaries of the first type; however, these deflections are much smaller because the incident angles result in much lower sensitivity.

In the example of FIG. 6, beam 602 is reflected within EOD 600 by total internal reflection (TIR). For n=2.2, the TIR angle of LiNbO$_3$ is 28°. The incident angle of light against the sides of EOD 600 is chosen in this example to be 30°, which is greater than the TIR angle.

FIG. 7 shows EOD 700. EOD 700 includes the structure shown in FIG. 6 with the addition of electrode 710. Electrode 710 is a conductive material that extends over at least one of the material regions. For example, electrode 710 is shown extending over all of the domain boundaries of a first type. In some embodiments, the back side includes a similar electrode (not shown) or an electrode covering the entire back surface (e.g., a ground plane). When a voltage V is applied between electrode 710 and a back side electrode, the refractive properties of the underlying domain boundaries are modified, resulting in deflection of the output beam.

FIG. 8 shows EOD 800. EOD 800 includes the structure shown in FIG. 6 with the addition of electrodes 810 and 820. Electrode 810 is similar to electrode 710 (FIG. 7), except that electrode 810 has a non-uniform or irregular shape. The example irregular shape shown in FIG. 8 includes randomly placed and shaped cuts on electrode 810 along the domain boundaries. This irregular shape creates uneven electric field across the boundary wall. Voltage variations make the beam shift laterally along the boundaries, and the uneven electric fields modulate the wavefront randomly as long as the deflecting voltage varies. Modulating the wavefront reduces the coherency of the light beam and reduces a phenomenon known as speckle.

Electrode 820 extends only over the last domain boundary. In some embodiments, electrode 820 is subjected to a voltage that is not related to the desired deflection. For example, a random or pseudo-random voltage may be applied to electrode 820 to actively modulate the beam wavefront. This provides wavefront modulation even when the deflection voltage on electrode 810 is static.

Although electrode 820 is shown only over the last domain boundary, this is not a limitation of the present invention. For example, electrode 820 may extend partially or completely over other domain boundaries. Also for example, in some embodiments, the function of electrode 820 is combined with electrode 810 by superimposing a random noise signal over the desired deflection signal that drives electrode 810.

As shown in FIGS. 6-8, the domain boundaries are non-parallel, although this is not a limitation of the present invention. For example, embodiments with parallel domain boundaries are described below with reference to later figures.

Figure 9A:
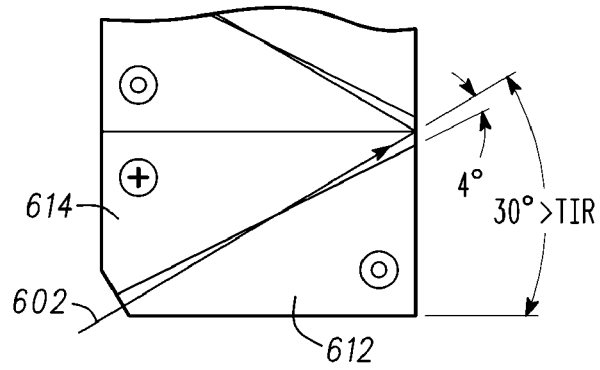
FIGS. 9A and 9B show grazing angles and light path angles within an electro-optical deflector in accordance with various embodiments of the present invention.
Figure 9B:
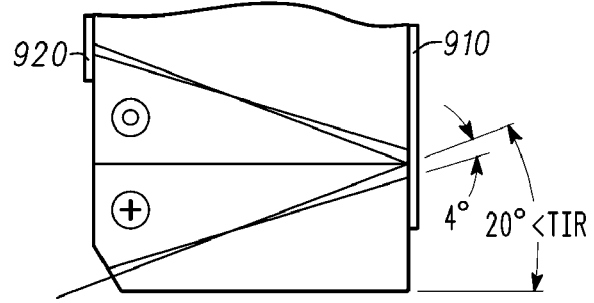

FIGS. 9A and 9B show grazing angles and light path angles within an electro-optical deflector in accordance with various embodiments of the present invention. FIG. 9A shows a grazing angle of 4° and a light path angle of 30°.

As described above with reference to FIG. 6, the TIR angle of LiNbO$_3$ for n=2.2 is 28°. Accordingly, in the example of FIG. 9A, beam 602 will reflect back into the device because 30° is greater than the TIR angle. This is an example of a reflection mechanism that causes the light to repeatedly cross between the plurality of material regions. The angle of domain boundaries and the grazing angles are chosen to ensure total internal reflection.

FIG. 9B shows a grazing angle of 4° and a light path angle of 20°. Following the same example of LiNbO$_3$ with a TIR of 28°, the light beam of FIG. 9B will not be subject to total internal reflection. Instead reflective coatings 910 and 920 are applied to the structure to ensure that the beam is reflected internally. This is an example of a reflection mechanism that causes the light to repeatedly cross between the plurality of material regions.

Any reflection mechanism may be employed without departing from the scope of the present invention. For example, the reflection mechanism may include TIR, reflective coatings, or any combination. Further embodiments that use reflective coatings are described below with reference to FIGS. 10-12.

Figure 10:
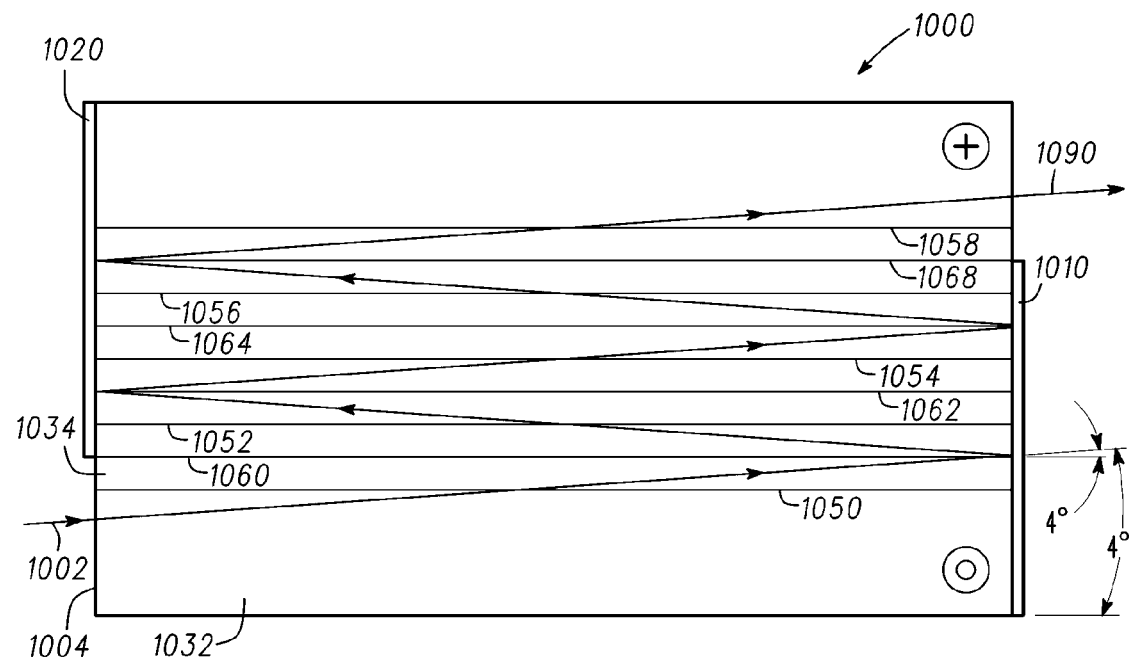
FIGS. 10-12 show electro-optical deflectors in accordance with various embodiments of the present invention.
Figure 11:
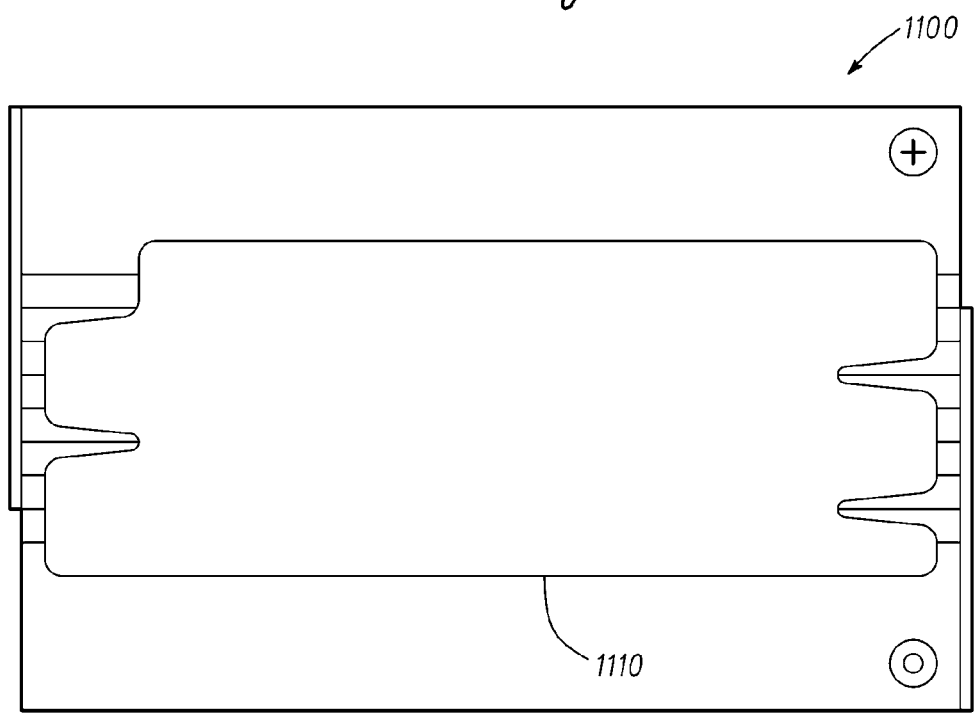
Figure 12:
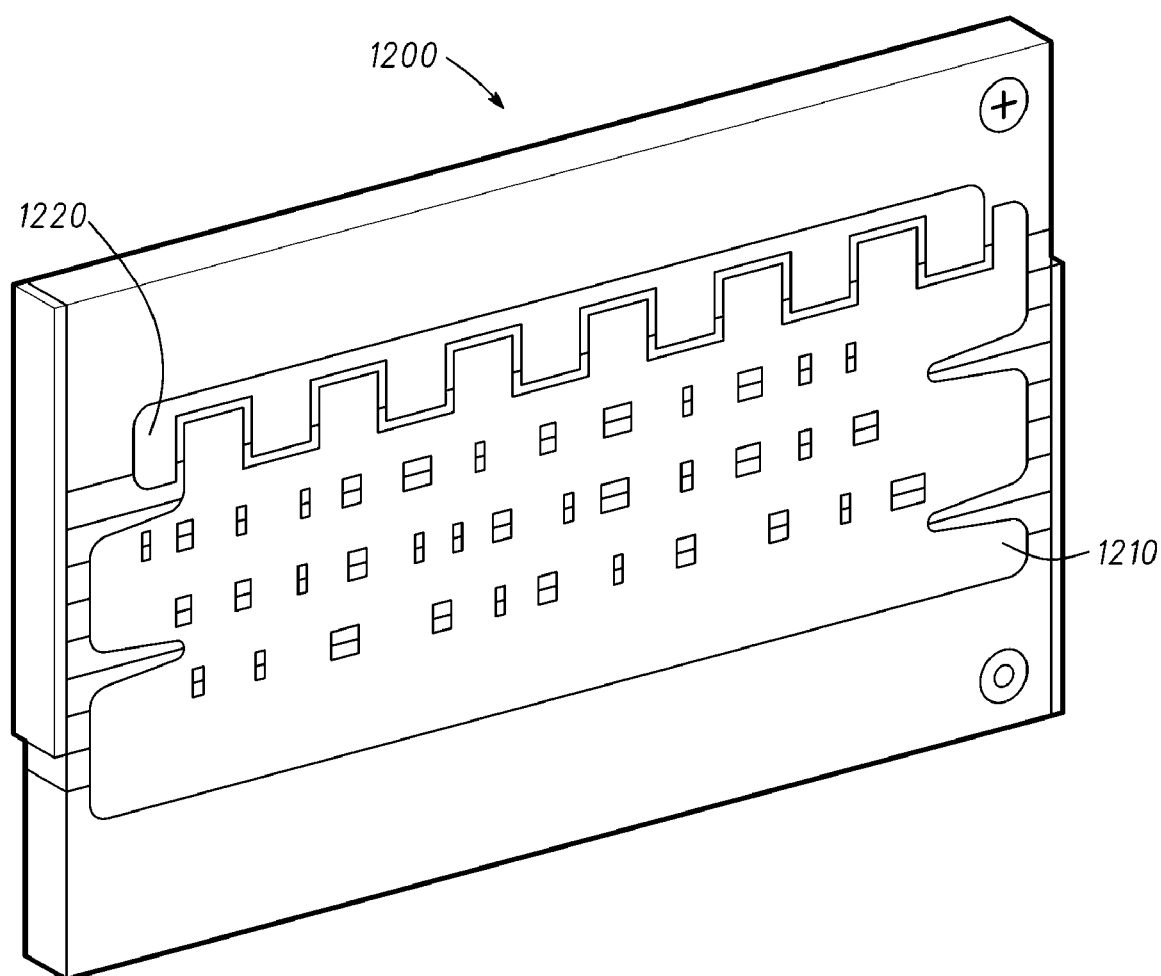

FIGS. 10-12 show electro-optical deflectors in accordance with various embodiments of the present invention. In contrast to the EODs shown in FIGS. 6-9, the EODs of FIGS. 10-12 have substantially parallel domain boundaries. Stated differently, the grazing angles and the light path angles are substantially the same (see FIGS. 9A and 9B). The grazing angle and light path angle are both labeled as 4° in FIG. 10, although the angle is exaggerated in the drawing to show the domain boundaries more clearly. Any angle may be used in these embodiments (e.g., not limited to 4°), however, when the grazing angle is increased, the deflection sensitivity to voltage variations decreases (see FIG. 5). In the example of FIG. 10, beam 1002 is reflected within EOD 600 by reflective coatings 1010 and 1020.

Laser beam 1002 enters EOD 1000 at face 604. Face 1004 can be at any angle, although it is shown here at substantially 90 degrees to beam 1002 to simplify the ray tracing. Beam 1002 enters EOD 1000 at non-inverted domain region 1012 and crosses boundary 1050 into inverted domain region 1014 at a grazing angle of substantially 4°. Beam 1002 is shown as a ray in FIG. 10, but in practice, the beam has a finite diameter. Small grazing angles give higher voltage sensitivity but require a longer boundary line to cover the beam cross section. Accordingly, although beam 1002 is shown crossing boundary 1050 at a single point, in operation, the wavefront of the beam 1002 crosses over a length of boundary 1050.

Beam 1002 reflects back and forth and repeatedly crosses like boundaries. For example, beam 1002 crosses voltage-dependent refractive boundaries 1050, 1052, 1054, 1056, and 1058, all of which are crossing from non-inverted domain regions to inverted domain regions at small grazing angles. These like boundaries are also referred to as boundaries of a first type. The deflection at each of these like boundaries sum to become part of the total deflection of the output beam 1090.

Beam 1002 also repeatedly crosses boundaries of a second type. For example, beam 1002 crosses voltage-dependent refractive boundaries 1060, 1062, 1064, and 1068, all of which are crossing from inverted domain regions to non-inverted domain regions. Note that the angles of the light beam are similar at both the boundary types. Accordingly, the deflection sensitivity is similar at boundaries of the first type and boundaries of the second type. In order to keep the deflection at the second-type boundaries from canceling the deflections at the first-type boundaries, the electrode is shaped to reduce the voltage applied at the second-type boundaries. This is described in more detail below with reference to FIG. 11.

FIG. 11 shows EOD 1100. EOD 1100 includes the structure shown in FIG. 10 with the addition of electrode 1110. Electrode 1110 is a conductive material that extends over at least one of the material regions. For example, electrode 1110 is shown extending over most of the face of the EOD with the exception of boundaries of the second type where the light beam is expected to cross. For example, electrode 1110 is etched away where the beam crosses boundary 1060 (see FIG. 10). Similarly, the electrode is also etched away where the beam crosses the remaining boundaries of the second type. This reduces the voltage applied at these boundary crossings, and therefore reduces the deflection contributions of these boundary crossings.

In some embodiments, the back side includes a similar electrode (not shown) or an electrode covering the entire back surface (e.g., a ground plane). When a voltage V is applied between electrode 1110 and a back side electrode, the refractive properties of the underlying domain boundaries are modified, resulting in deflection of the output beam.

FIG. 12 shows EOD 1200. EOD 1200 includes the structure shown in FIG. 6 with the addition of electrodes 1210 and 1220. Electrode 1210 is similar to electrode 1110 (FIG. 11), except that electrode 1210 has a non-uniform or irregular shape. The example irregular shape shown in FIG. 12 includes randomly placed and shaped cuts on electrode 1210 along the domain boundaries. This irregular shape creates uneven electric field across the boundary wall. Voltage variations make the beam shift laterally along the boundaries, and the uneven electric fields modulate the wavefront randomly as long as the deflecting voltage varies. Modulating the wavefront reduces the coherency of the light beam and reduces a phenomenon known as speckle.

Electrode 1220 extends only over the last domain boundary. In some embodiments, electrode 1220 is subjected to a voltage that is not related to the desired deflection. For example, a random or pseudo-random voltage may be applied to electrode 1220 to actively modulate the beam wavefront. This provides wavefront modulation even when the deflection voltage on electrode 1210 is static.

Although electrode 1220 is shown only over the last domain boundary, this is not a limitation of the present invention. For example, electrode 1220 may extend partially or completely over other domain boundaries. Also for example, in some embodiments, the function of electrode 1220 is combined with electrode 1210 by superimposing a random noise signal over the desired deflection signal that drives electrode 1210.

Any of the EOD embodiments may be utilized in any of the EOM embodiments of the present invention. For example, referring now back to FIGS. 1A-1C and 2A-2C, EOD 120 may include any of the EOD embodiments described with reference to FIGS. 6-12. EODs with multiple boundary crossings may include TIR reflection mechanisms, reflective coating reflection mechanisms, or any other suitable reflection mechanisms. Further, EODs with multiple boundary crossings may have parallel or non-parallel domain boundaries, and grazing angles may be similar or different at different type boundaries. Unwanted deflection at boundaries of a second type may be reduced by increasing angles to reduce sensitivity, shaping electrodes to reduce applied voltages where the boundaries are crossed, or any combination. Accordingly, modulated laser light sources in accordance with various embodiments of the present invention may include any combination of these elements. Further, no element or feature of the EODs described herein is to be considered as essential.

Figure 13:
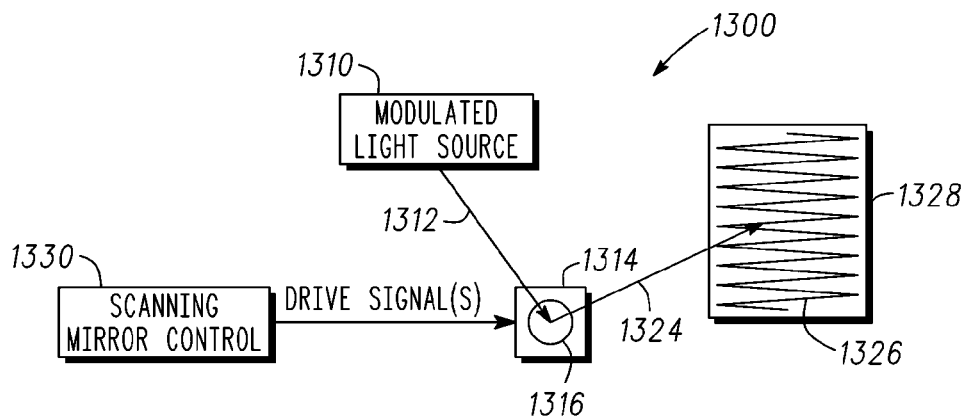
FIGS. 13 and 14 show scanning laser projectors in accordance with various embodiments of the present invention.

FIG. 13 shows a scanned beam projection system in accordance with various embodiments of the present invention. As shown in FIG. 13, scanned beam projection system 1300 includes a modulated light source 1310, which may be an electro-optical modulator (e.g., EOM 100, 200), capable of emitting an output beam 1312. The beam 1312 impinges on a scanning platform 1314 which is part of a microelectromechanical system (MEMS) based scanner or the like, and reflects off of scanning mirror 1316 to generate a controlled output beam 1324. A scanning mirror control circuit 1330 provides one or more drive signal(s) to control the angular motion of scanning mirror 1316 to cause output beam 1324 to generate a raster scan 1326 on a projection surface 1328.

In some embodiments, raster scan 1326 is formed by combining a sinusoidal component on the horizontal axis and a sawtooth component on the vertical axis. In these embodiments, controlled output beam 1324 sweeps back and forth left-to-right in a sinusoidal pattern, and sweeps vertically (top-to-bottom) in a sawtooth pattern with the display blanked during flyback (bottom-to-top). FIG. 13 shows the sinusoidal pattern as the beam sweeps vertically top-to-bottom, but does not show the flyback from bottom-to-top. In other embodiments, the vertical sweep is controlled with a triangular wave such that there is no flyback. In these embodiments, pixels may be painted in one vertical direction or in both vertical directions. In still further embodiments, the vertical sweep is sinusoidal. The various embodiments of the invention are not limited by the waveforms used to control the vertical and horizontal sweep or the resulting raster pattern.

Modulated light source 1310 may source light at any wavelength. For example, in some embodiments, modulated light source 1310 sources light in the visible spectrum, and in other embodiments, modulated light source 1310 sources light in the nonvisible spectrum.

Figure 14:
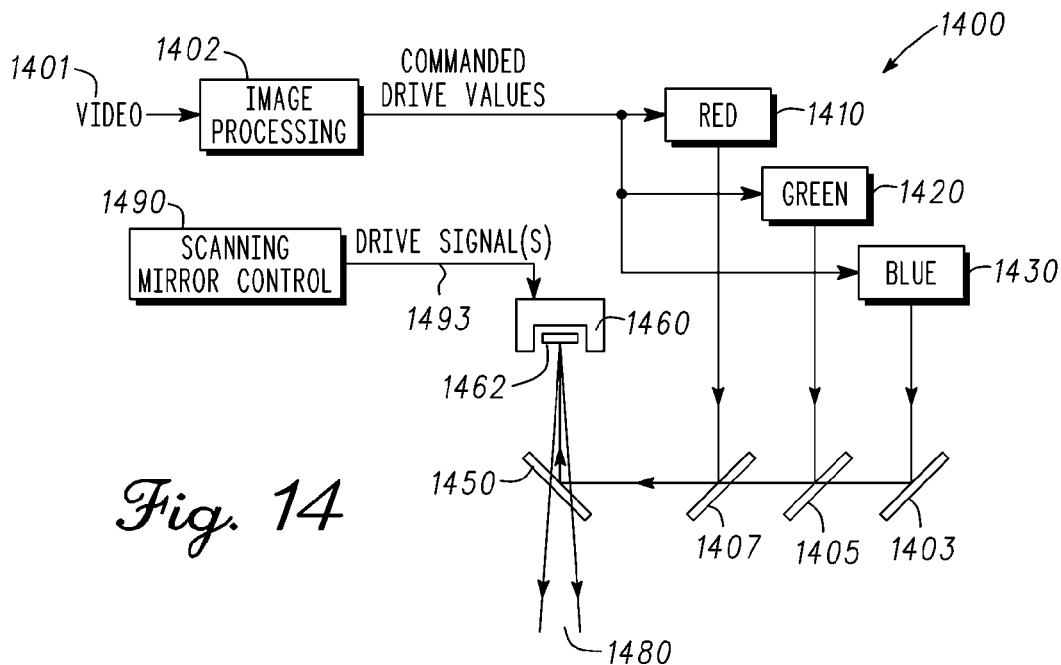

FIG. 14 shows a color laser projection apparatus. System 1400 includes image processing component 1402, laser light sources 1410, 1420, and 1430. Projection system 1400 also includes mirrors 1403, 1405, and 1407, fold mirror 1450, micro-electronic machine (MEMS) device 1460 having mirror 1462, and scanning mirror control component 1490.

In operation, image processing component 1402 receives video data on node 1401, and produces commanded drive values to drive the laser light sources when pixels are to be displayed. Image processing component 1402 may include any suitable hardware and/or software useful to produce commanded drive values from video data. For example, image processing component 1402 may include application specific integrated circuits (ASICs), one or more processors, or the like.

Laser light sources 1410, 1420, and 1430 receive commanded drive values and produce light. Laser light sources 1410, 1420, and 1430 may include any of the modulated light sources with multiple domain boundary crossings as described herein. In some embodiments, one of laser light sources includes a modulated light source as described herein and the other two include laser diodes driven directly by the commanded drive values. For example, green laser light source 1420 may include a green laser light source, an electro-optical deflector, and a coupling mechanism to form an electro-optical modulator for green laser light. Also for example red laser light source 1410 and blue laser light source 1430 may include laser diodes. Any combination of laser light sources may be included without departing from the scope of the present invention.

Each light source produces a narrow beam of light which is directed to the MEMS mirror via guiding optics. For example, blue laser light source 1430 produces blue light which is reflected off mirror 1403 and is passed through mirrors 1405 and 1407; green laser light source 1420 produces green light which is reflected off mirror 1405 and is passed through mirror 1407; and red laser light source 1410 produces red light which is reflected off mirror 1407. At 1409, the red, green, and blue light are combined. The combined laser light is reflected off mirror 1450 on its way to MEMS mirror 1462. The MEMS mirror rotates on two axes in response to electrical stimuli received on node 1493 from scanning mirror control 1490. After reflecting off MEMS mirror 1462, the laser light bypasses mirror 1450 to create an image at 1480.

The MEMS based projector is described as an example application, and the various embodiments of the invention are not so limited. For example, the electro-optical modulation apparatus described herein may be used with other optical systems without departing from the scope of the present invention.

Figure 15:
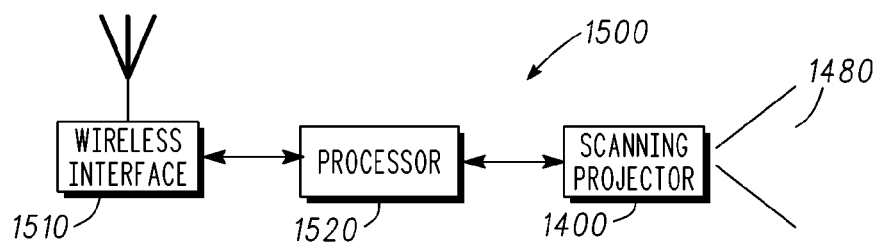
FIG. 15 shows a block diagram of a mobile device in accordance with various embodiments of the present invention.

FIG. 15 shows a block diagram of a mobile device in accordance with various embodiments of the present invention. As shown in FIG. 15, mobile device 1500 includes wireless interface 1510, processor 1520, and scanning projector 1400. Scanning projector 1400 paints a raster image at 1480. Scanning projector 1400 is described with reference to FIG. 14. In some embodiments, scanning projector 1400 includes one or more modulated laser light sources with light paths that cross multiple domain boundaries, such as those shown in, and described with reference to, earlier figures.

Scanning projector 1400 may receive image data from any image source. For example, in some embodiments, scanning projector 1400 includes memory that holds still images. In other embodiments, scanning projector 1400 includes memory that includes video images. In still further embodiments, scanning projector 1400 displays imagery received from external sources such as connectors, wireless interface 1510, or the like.

Wireless interface 1510 may include any wireless transmission and/or reception capabilities. For example, in some embodiments, wireless interface 1510 includes a network interface card (NIC) capable of communicating over a wireless network. Also for example, in some embodiments, wireless interface 1510 may include cellular telephone capabilities. In still further embodiments, wireless interface 1510 may include a global positioning system (GPS) receiver. One skilled in the art will understand that wireless interface 1510 may include any type of wireless communications capability without departing from the scope of the present invention.

Processor 1520 may be any type of processor capable of communicating with the various components in mobile device 1500. For example, processor 1520 may be an embedded processor available from application specific integrated circuit (ASIC) vendors, or may be a commercially available microprocessor. In some embodiments, processor 1520 provides image or video data to scanning projector 1400. The image or video data may be retrieved from wireless interface 1510 or may be derived from data retrieved from wireless interface 1510. For example, through processor 1520, scanning projector 1400 may display images or video received directly from wireless interface 1510. Also for example, processor 1520 may provide overlays to add to images and/or video received from wireless interface 1510, or may alter stored imagery based on data received from wireless interface 1510 (e.g., modifying a map display in GPS embodiments in which wireless interface 1510 provides location coordinates).

Figure 16:
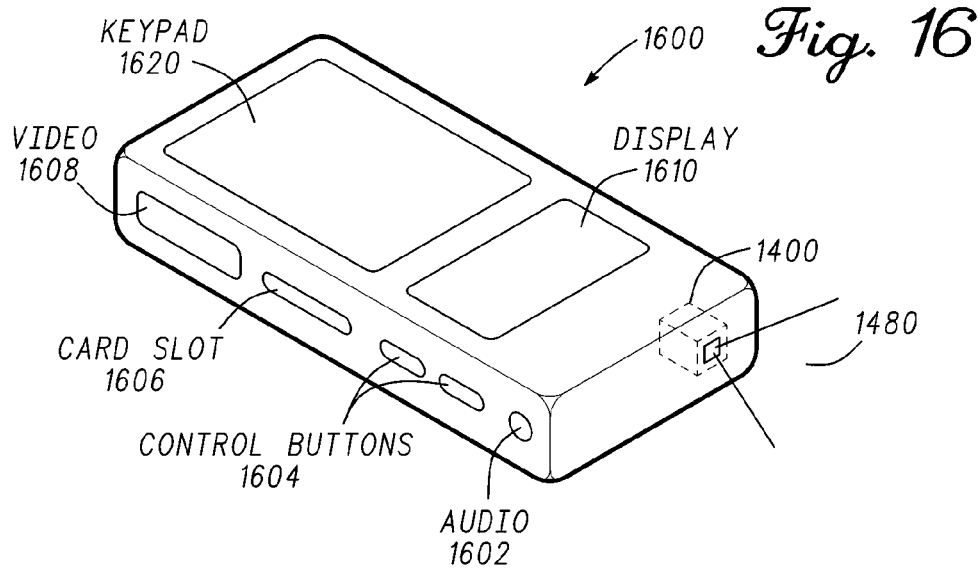
FIG. 16 shows a mobile device in accordance with various embodiments of the present invention.

FIG. 16 shows a mobile device in accordance with various embodiments of the present invention. Mobile device 1600 may be a hand held projection device with or without communications ability. For example, in some embodiments, mobile device 1600 may be a handheld projector with little or no other capabilities. Also for example, in some embodiments, mobile device 1600 may be a device usable for communications, including for example, a cellular phone, a smart phone, a personal digital assistant (PDA), a global positioning system (GPS) receiver, or the like. Further, mobile device 1600 may be connected to a larger network via a wireless (e.g., WiMax) or cellular connection, or this device can accept data messages or video content via an unregulated spectrum (e.g., WiFi) connection.

Mobile device 1600 includes scanning projector 1400 to create an image with light at 1480. Mobile device 1600 also includes many other types of circuitry; however, they are intentionally omitted from FIG. 16 for clarity.

Mobile device 1600 includes display 1610, keypad 1620, audio port 1602, control buttons 1604, card slot 1606, and audio/video (A/V) port 1608. None of these elements are essential. For example, mobile device 1600 may only include scanning projector 1400 without any of display 1610, keypad 1620, audio port 1602, control buttons 1604, card slot 1606, or A/V port 1608. Some embodiments include a subset of these elements. For example, an accessory projector product may include scanning projector 1400, control buttons 1604 and A/V port 1608.

Display 1610 may be any type of display. For example, in some embodiments, display 1610 includes a liquid crystal display (LCD) screen. Display 1610 may always display the same content projected at 1480 or different content. For example, an accessory projector product may always display the same content, whereas a mobile phone embodiment may project one type of content at 1480 while display different content on display 1610. Keypad 1620 may be a phone keypad or any other type of keypad.

A/V port 1608 accepts and/or transmits video and/or audio signals. For example, A/V port 1608 may be a digital port that accepts a cable suitable to carry digital audio and video data. Further, A/V port 1608 may include RCA jacks to accept composite inputs. Still further, A/V port 1608 may include a VGA connector to accept analog video signals. In some embodiments, mobile device 1600 may be tethered to an external signal source through A/V port 1608, and mobile device 1600 may project content accepted through A/V port 1608. In other embodiments, mobile device 1600 may be an originator of content, and A/V port 1608 is used to transmit content to a different device.

Audio port 1602 provides audio signals. For example, in some embodiments, mobile device 1600 is a media player that can store and play audio and video. In these embodiments, the video may be projected at 1480 and the audio may be output at audio port 1602. In other embodiments, mobile device 1600 may be an accessory projector that receives audio and video at A/V port 1608. In these embodiments, mobile device 1600 may project the video content at 1480, and output the audio content at audio port 1602.

Mobile device 1600 also includes card slot 1606. In some embodiments, a memory card inserted in card slot 1606 may provide a source for audio to be output at audio port 1602 and/or video data to be projected at 1480. Card slot 1606 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

Figure 17:
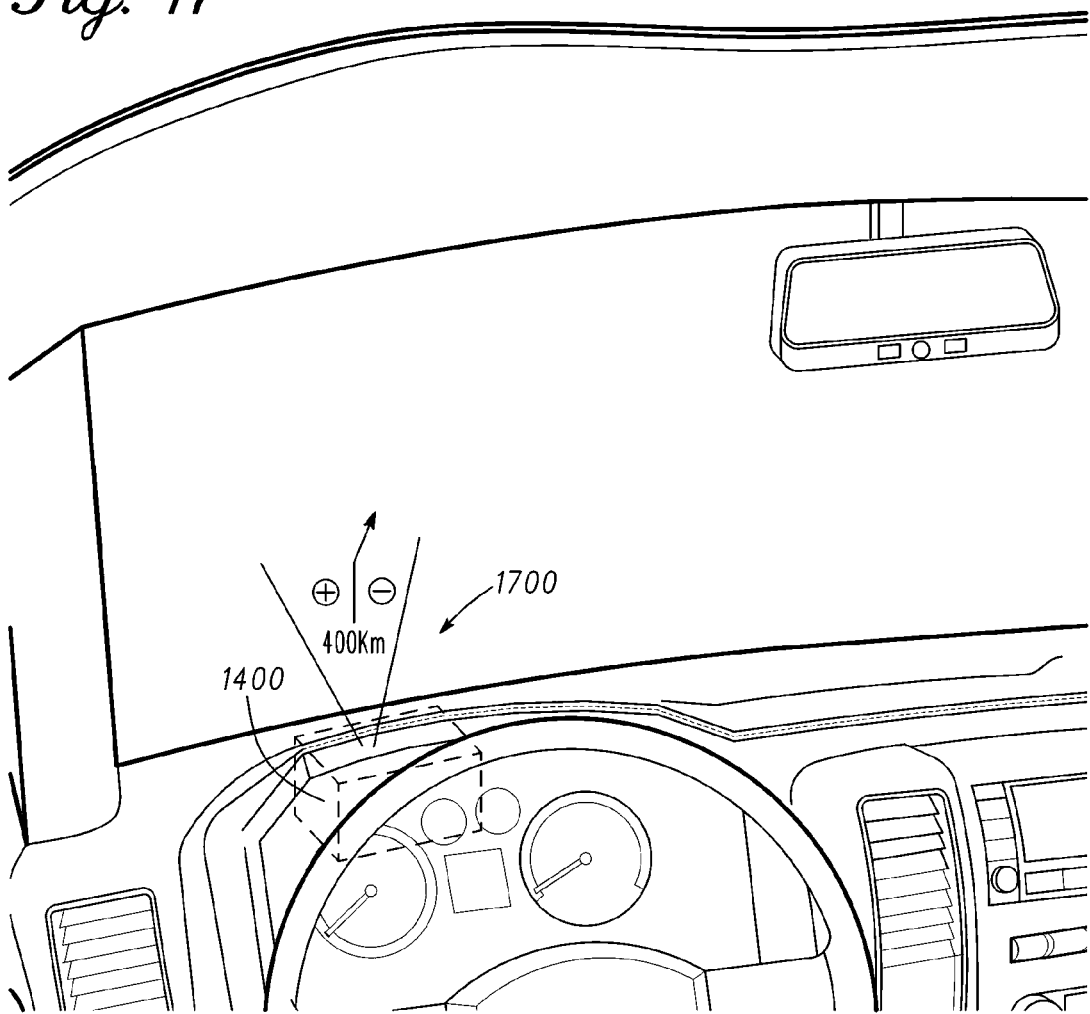
FIG. 17 shows a head-up display system in accordance with various embodiments of the invention.

FIG. 17 shows a head-up display system in accordance with various embodiments of the invention. Projector 1400 is shown mounted in a vehicle dash to project the head-up display at 1700. Although an automotive head-up display is shown in FIG. 17, this is not a limitation of the present invention. For example, various embodiments of the invention include head-up displays in avionics application, air traffic control applications, and other applications.

Figure 18:
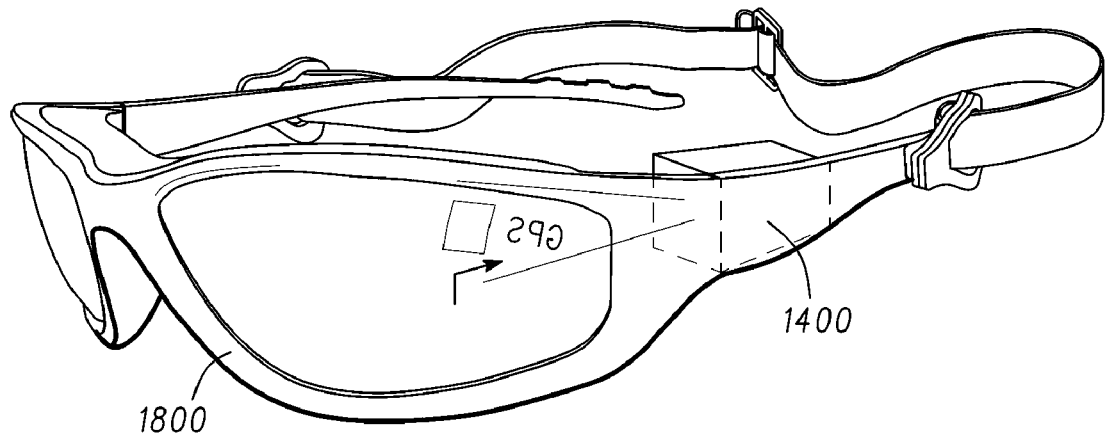
FIG. 18 shows eyewear in accordance with various embodiments of the invention.

FIG. 18 shows eyewear in accordance with various embodiments of the invention. Eyewear 1800 includes projector 1400 to project a display in the eyewear's field of view. In some embodiments, eyewear 1800 is see-through and in other embodiments, eyewear 1800 is opaque. For example, eyewear may be used in an augmented reality application in which a wearer can see the display from projector 1400 overlaid on the physical world. Also for example, eyewear may be used in a virtual reality application, in which a wearer's entire view is generated by projector 1400. Although only one projector 1400 is shown in FIG. 18, this is not a limitation of the present invention. For example, in some embodiments, eyewear 1800 includes two projectors; one for each eye.

Figure 19:
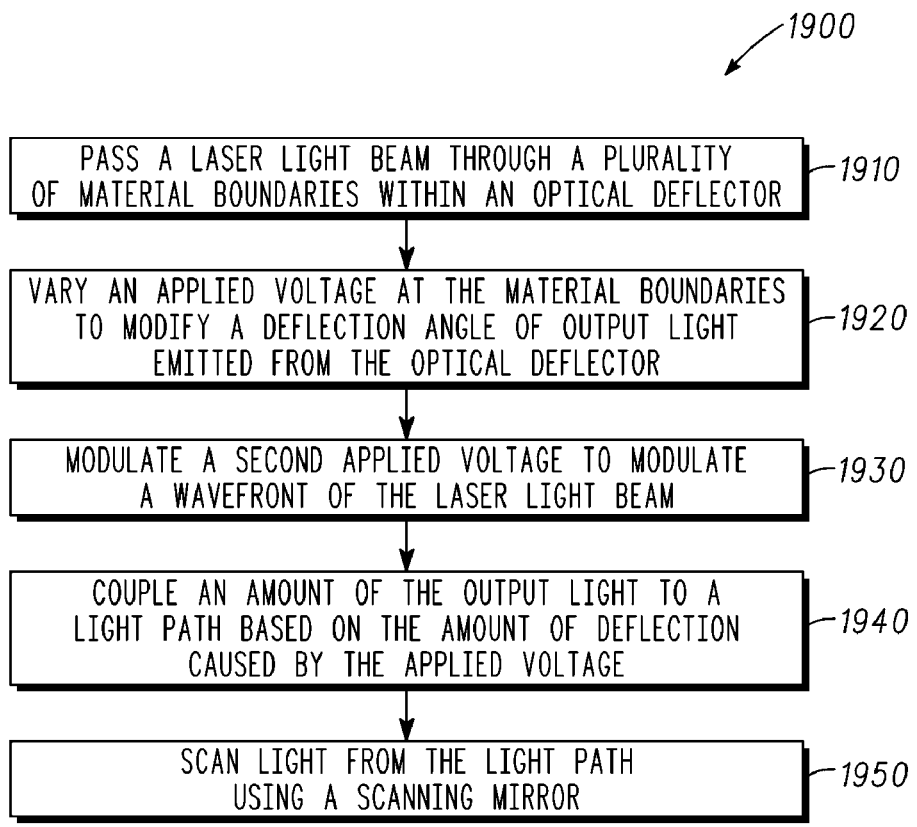
FIG. 19 shows a flowchart in accordance with various embodiments of the present invention.

FIG. 19 shows a flowchart in accordance with various embodiments of the present invention. In some embodiments, method 1900, or portions thereof, is performed by a scanning laser projector, embodiments of which are shown in previous figures. In other embodiments, method 1900 is performed by a series of circuits or an electronic system. Method 1900 is not limited by the particular type of apparatus performing the method. The various actions in method 1900 may be performed in the order presented, or may be performed in a different order. Further, in some embodiments, some actions listed in FIG. 19 are omitted from method 1900.

Method 1900 is shown beginning with block 1910 in which a laser light is passed through a plurality of material boundaries within an optical deflector. In some embodiments, this corresponds to a laser beam being reflected within a device using a reflective mechanism such as TIR or a reflective coating. The material boundaries may be formed between domain inverted ferroelectric materials and non-domain inverted ferroelectric materials. Lithium Niobate and Lithium Tantalate are examples. The boundaries may be substantially parallel, or may be nonparallel.

At 1920, a voltage applied at the material boundaries is varied to modify a deflection angle of output light emitted from the optical deflector. In some embodiments, this corresponds to applying a voltage at every material boundary where the light beam crosses, and in other embodiments, this corresponds to applying a voltage only at like material boundaries where the light beam crosses. Examples are shown in FIGS. 7, 8, 11, and 12.

In some embodiments, the voltage of 1920 is applied to an electrode with an irregular pattern. The irregular pattern results in a varied electric field as the voltage is varied, causing a wavefront of the laser beam to be modulated as it crossed the boundary.

At 1930, a second applied voltage is modulated to modulate a wavefront of the laser light beam. In some embodiments, a separate electrode is placed over at least a portion of one boundary. Modulating a voltage on this electrode provides wavefront modulation even when the deflection voltage applied at 1920 is held constant. Wavefront modulation may reduce speckle in the resulting laser beam.

At 1940, an amount of the output light is coupled to a light path based on the amount of deflection caused by the applied voltage. In some embodiments, this corresponds to coupling light through a pinhole, slit, or fiber, as shown in FIGS. 1A-1C and 2A-2C. This coupling results light that is modulated as a function of the deflection voltage applied at 1920.

At 1950, light from the light path is scanned using a scanning mirror. For example, light from a modulated light source may be scanned as shown in FIGS. 13 and/or 14. The scanned light may project an image in any application, including those shown in the figures.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
   a plurality of material regions having voltage-dependent indices of refraction;
   a reflection mechanism to reflect light in a manner that causes the light to repeatedly cross between the plurality of regions; and
   at least one conductive element positioned to apply a voltage to at least one of the plurality of material regions, wherein the conductive element extends over adjacent ones of the plurality of material regions, and wherein the conductive element has an irregular shape to modulate a wavefront crossing between adjacent ones of the plurality of material regions.

2. An apparatus comprising:
   a plurality of material regions having voltage-dependent indices of refraction;
   a reflection mechanism to reflect light in a manner that causes the light to repeatedly cross between the plurality of regions; and
   at least one conductive element positioned to apply a voltage to at least one of the plurality of material regions, wherein the plurality of material regions are positioned to form non-parallel boundaries.

3. A laser beam deflection device comprising:
   multiple boundaries between crystalline materials having differing voltage-dependent indices of refraction;
   a light path that crosses boundaries of a first type at first angles and boundaries of a second type at second angles larger than the first angles; and
   an electrode placed to apply a voltage to the laser beam deflection device at the multiple boundaries.

4. The laser beam deflection device of claim 3 wherein the materials having differing voltage-dependent indices of refraction comprise a poled ferroelectric material.

5. The laser beam deflection device of claim 3 wherein the electrode comprises a nonuniform conductive element to modulate a wavefront in the light path.

6. A laser beam deflection device comprising:
   multiple boundaries between crystalline materials having differing voltage-dependent indices of refraction;
   a light path that crosses boundaries of a first type and boundaries of a second type at similar angles; and
   an electrode placed to apply a voltage to the laser beam deflection device at the boundaries of a first type where the light path crosses.

7. The laser beam deflection device of claim 6 wherein the materials having differing voltage-dependent indices of refraction comprise a poled ferroelectric material.

8. The laser beam deflection device of claim 6 wherein the electrode comprises a nonuniform conductive element to modulate a wavefront in the light path.

* * * * *